(12) United States Patent
Gause

(10) Patent No.: US 7,955,082 B1
(45) Date of Patent: Jun. 7, 2011

(54) BASKETBALL TRAINING DEVICE AND METHOD

(76) Inventor: Andrew Loyall Gause, Conroe, TX (US)

( * ) Notice: Subject to any disclaimer, the term of this patent is extended or adjusted under 35 U.S.C. 154(b) by 453 days.

(21) Appl. No.: 12/069,629

(22) Filed: Feb. 11, 2008

Related U.S. Application Data

(60) Provisional application No. 60/900,598, filed on Feb. 9, 2007.

(51) Int. Cl.
*G09B 19/00* (2006.01)
(52) U.S. Cl. ............... 434/248; 273/317.3; 473/416; 473/422; 473/447
(58) Field of Classification Search ............ 434/248; 84/404, 405; 473/447, 472
See application file for complete search history.

(56) References Cited

U.S. PATENT DOCUMENTS

| | | | | |
|---|---|---|---|---|
| 1,831,552 A | * | 11/1931 | Bossard | 84/103 |
| 3,552,749 A | | 1/1971 | Piggotte | |
| 4,286,779 A | * | 9/1981 | Collins | 273/402 |
| 4,989,862 A | | 2/1991 | Curtis | |
| 5,450,779 A | * | 9/1995 | Yancy | 84/404 |
| 5,527,185 A | | 6/1996 | Davis | |
| 5,720,485 A | * | 2/1998 | Oswald | 273/402 |
| 5,769,742 A | | 6/1998 | Bristow | |
| 5,800,291 A | | 9/1998 | Grover | |
| 5,816,951 A | | 10/1998 | Hudock | |
| 5,890,985 A | | 4/1999 | Jenney | |
| 6,604,691 B1 | * | 8/2003 | Thomas et al. | 239/276 |
| 6,640,742 B1 | * | 11/2003 | Grupp | 116/169 |
| 6,881,161 B2 | | 4/2005 | Heflin, Sr. | |

* cited by examiner

*Primary Examiner* — Gene Kim
*Assistant Examiner* — Joseph B Baldori
(74) *Attorney, Agent, or Firm* — Kenneth A. Roddy

(57) ABSTRACT

A portable basketball training device and method for creating visual distractions adjacent to an elevated transparent basketball backboard in the vicinity of the rim to facilitate increasing a player's concentration, focus, skill and accuracy in goal shooting. The device includes a housing mounted on the backboard that contains a motorized reciprocating member, and a plurality of movable vision distracters disposed on a back side of the backboard suspended from the reciprocating member having body portions extending downwardly from the housing in the vicinity of the rim which swing or bounce from side behind the backboard in the vicinity of the rim. This motion tends to distract the player's attention and cause them to lose their concentration on making the shot. However, over time, a player will learn to increase their concentration and focus to overcome this distraction, and thereby enhance their skill and accuracy in goal shooting.

3 Claims, 3 Drawing Sheets

US 7,955,082 B1

BASKETBALL TRAINING DEVICE AND METHOD

CROSS REFERENCE TO RELATED APPLICATION

This application claims priority of U.S. Provisional Application Ser. No. 60/900,598, filed Feb. 9, 2007, the pendency of which is extended until Feb. 11, 2008 under 35 U.S.C. 119(e)(3).

BACKGROUND OF THE INVENTION

1. Field of the Invention

This invention relates generally to basketball practice and training devices and methods, and more particularly to a portable training device mounted on a transparent basketball backboard that creates a visual distraction for training players to increase their concentration, focus, skill and accuracy in goal shooting.

2. Background Art

It is well known by coaches, trainers and players in the sport of basketball, that it is much easier to successfully complete various shots to the basket when there are no distractions, and the shooter gets an unobstructed view of the basket. Typically the serious basketball player will spend many hours in on-court or off-court practice, with or without opponents, but where there are no visual distractions of spectators.

However, in actual game situations, various visual distractions and noise from the spectators can significantly impair the shooter's concentration and focus and, hence, the accuracy of a shot, particularly under pressure situations. For example, in actual game situations, players must contend with fans waving distracting signs, foam noodles, streamers, or other props while they are making a shot. It is also well known that the ability of a player to maintain their concentration under pressure situations is one of the key factors to success, and that losing focus can cause a player to become an ineffective shooter during a game. The visual distraction problem is even greater in professional and collegiate basketball courts wherein the backboards are constructed of transparent or clear acrylic or tempered glass materials to allow spectators to view the game through the backboard, and which also allow the player making a shot to see the fans waving distracting signs, foam noodles, streamers, or other props.

There are several patents that are directed toward various basketball practice and training devices that are positioned in front of the goal to present a physical obstacle to a player approaching and making a shot. Most of these types of devices utilize a frame or carriage with movable members or a lifelike dummy the form of a simulated defensive opponent with articulated limbs that simulate the outstretched arms of a defensive opponent attempting to block a shot.

Piggotte, U.S. Pat. No. 3,552,749 discloses a motorized basketball training aid which includes a life-sized figure of a defensive opponent, and a plurality of rotatably driven arms encased in a cushioning material that project radially outward from a central hub, and rotate in a clockwise or counterclockwise direction similar to a windmill to simulate movements of a defensive opponent.

Curtis, U.S. Pat. No. 4,989,862 discloses a basketball game practice device which formed from resilient, durable synthetic foam that simulates a defensive basketball player for practicing offensive moves such as shooting. The device can be selectively adjusted to various heights and the arms are manually rotatable in order for an offensive player to sharpen his shooting skills without the necessity of an opponent being present.

Davis, U.S. Pat. No. 5,527,185 discloses an athletic training device comprising a base, an upright supported by the base, and a planar training shape simulative of a human athlete, including head, torso, arms and legs, mounted on the upright. The vertical height of the training shape is adjustable, and the arms articulate at the elbows and shoulders so that the position of the arms is adjustable. The training shape will remain at the adjusted height with the arms in a predetermined posture, so that the training device will represent an opponent at the precise posture and position for which the ball handler seeks to develop the countermove.

Bristow, U.S. Pat. No. 5,769,742 discloses a mechanical athletic training device that includes a mobile carriage which is lockable in a stationary position and has an opponent simulator, such as a hockey stick, pivotally connected to the carriage. The pivoting opponent simulator simulates the movements and actions of a defensive or offensive player and forces the athlete to anticipate the movements of the opponent simulator and play through the opponent simulator rather than around it.

Grover, U.S. Pat. No. 5,800,291 discloses a basketball practice or training apparatus including a floor mount and a vertical standard extending upwardly therefrom. Elongate arm shot obstructions at the top of the standard are removably mounted for changing the configuration of the shot obstruction, such as for practicing jump shots versus free throws. A guarding mechanism is secured to the standard and includes a player-engaging portion in front of the standard and spaced above the floor mount. Preferably, the player-engaging portion is selectively movable transversely of the standard to adjust its position in front of the standard so as to allow an operator to manipulate the guarding mechanism for keeping the player-engaging portion close to the player even if they change their position relative to the standard.

Hudock, U.S. Pat. No. 5,816,951 discloses a sports training device, which is a simulated human figure supported by a stand and has a trigger device in the form of a flexible mat disposed on the ground or floor in front of the figure. The figure has at least one movable limb; a fluid-containing actuating system connected to the movable limb, and the trigger device is connected to the fluid-containing actuating system for activating the fluid-containing actuating system. The training device provides a distractive movement to acclimate the sports player to distractions.

Jenney, U.S. Pat. No. 5,890,985 discloses a portable basketball training aid to improve the player's shooting accuracy, which is placed on a floor in the vicinity of an elevated basketball hoop and board to improve the player's concentration and shooting accuracy while being distracted by vision restrictors which simulate realistic game conditions. The device includes a plurality of height extendible thin flexible supports extending upward from the top of a rigid support member. The vision restrictors are attached to the free end of the flexible support and the supports are sufficiently flexible so as to undergo bending deflection responsive to minimal air movement, thus simulating the distractive efforts of an opponent's, waving, hands-in-your-face, guarding technique. The vision restrictors are in the form of a hand, glove, oval, diamond or rectangle within predetermined size and predetermined weight limits so as to not interfere with the flexibility and function of the flexible supports.

Hefflin, Sr., U.S. Pat. No. 6,881,161 discloses a basketball training apparatus for improving shooting skills and accuracy that is adapted for use with a basketball rim placed above a playing surface, and comprises a base on the playing surface beneath the basketball rim, a plurality of arms extending in radial directions from the base, a plurality of shooting markers spaced apart along the length of each arm, and vision markers attached to the basketball rim. Each vision marker is radially aligned with a corresponding one of the arms. With this arrangement, a user, when standing on one of the shooting markers and facing the basketball rim, is provided with visual shooting assistance as a result of the arm being radially aligned with one of the vision markers located on a region of the basketball rim that is nearest the user.

While these devices fulfill their respective, particular objective and requirements, the aforementioned patents do not describe devices that are mounted on a basketball backboard and have movable members that create a visual distraction simulating game condition distractions for training players to increase their concentration, focus, skill and accuracy in goal shooting.

SUMMARY OF THE INVENTION

It is therefore and object of the present invention to provide a basketball training device that is adapted to be mounted on a conventional transparent or clear basketball backboard and has a plurality of movable members that are disposed on the back side of the backboard and create a visual distraction simulating game condition distractions during practice sessions for training players to increase their concentration, focus, skill and accuracy in goal shooting.

It is another object of the present invention to provide a basketball training method which operates on the principle of creating a visual distraction simulating game condition distractions during practice sessions for training players to increase their concentration, focus, skill and accuracy in goal shooting.

Another object of the present invention is to provide a portable basketball training device that creates a visual distraction simulating game condition distractions which does not occupy any floor space and does not present any physical obstacles positioned in front of the goal to hinder or block a player during approaching the goal and making a shot.

A further object of the present invention is to provide a portable basketball training device that easily transported, and easily and quickly installed on and removed from the basketball backboard.

A still further object of this invention is to provide a portable basketball training device that is simple in construction, inexpensive to manufacture and rugged and reliable in operation.

Other objects of the invention will become apparent from time to time throughout the specification and claims as hereinafter related.

DESCRIPTION OF THE PREFERRED EMBODIMENT

Figure 1:
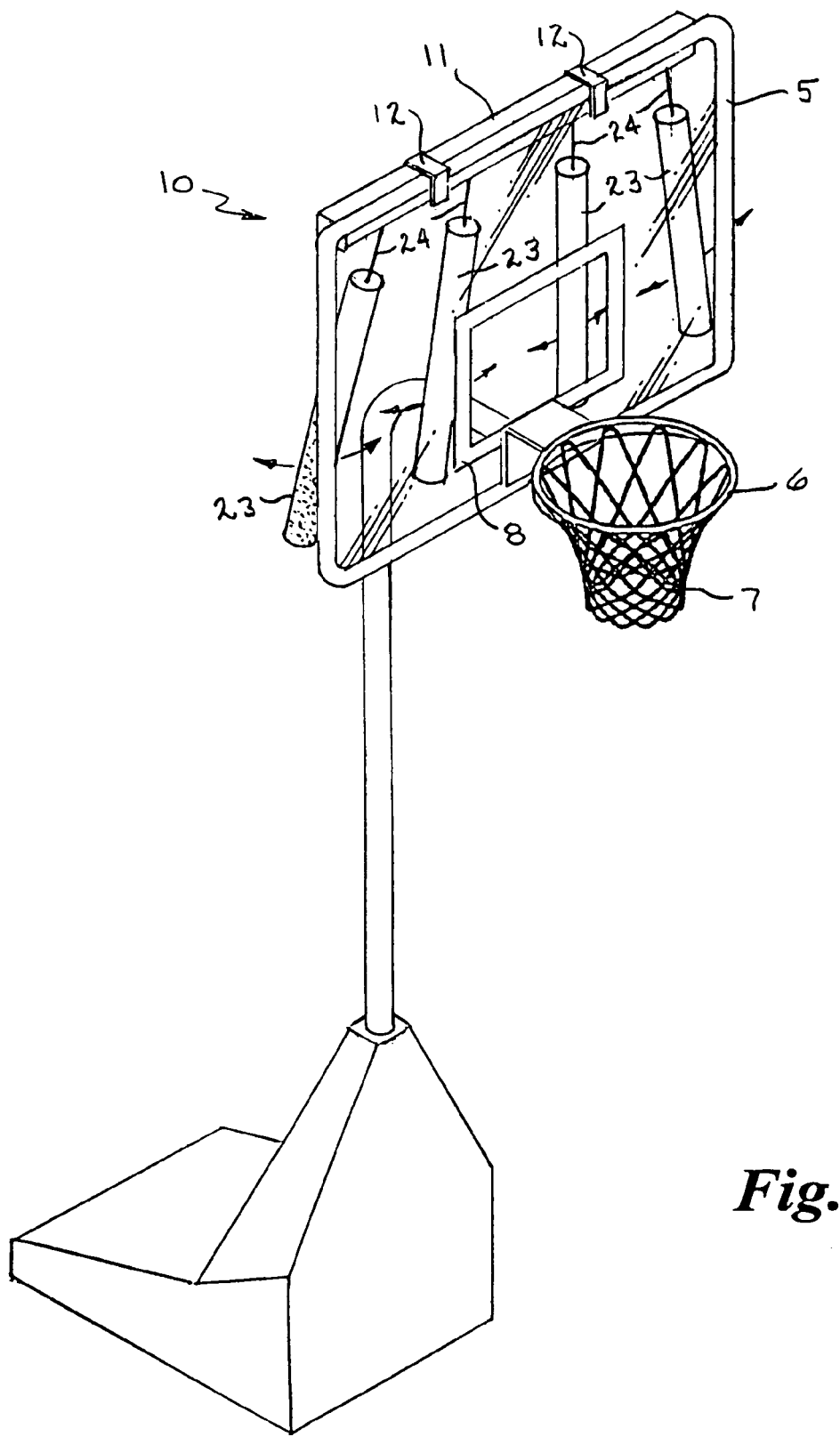
FIG. 1 is a perspective view of the basketball training device in accordance with the present invention mounted on a basketball backstop, shown from the front side of the backstop.

While this invention is susceptible of embodiment in many different forms, there is shown in the drawings and will herein be described in detail, a preferred embodiment, with the understanding that the present disclosure is to be considered as an exemplification of the principles of the invention and is not intended to limit the invention to the embodiment illustrated.

In the illustrated example, as seen in FIG. 1, the basketball training device 10 is shown in conjunction with a conventional transparent basketball backboard and freestanding goal assembly, however, it should be understood that the present training device may also be mounted on wall and ceiling mounted goals. The major components of the basketball goal generally include a generally planar transparent backboard 5 having a front side, a back side, a top end, a bottom end and lateral sides, with a hoop or rim 6 mounted on the front side near the bottom end supporting a net 7. Transparent backboards also typically include a white rectangular target area 8 on the front side centered behind the rim. The backboard frame and support structure features are well known in the art, and therefore are not shown and described in detail.

Figure 2:
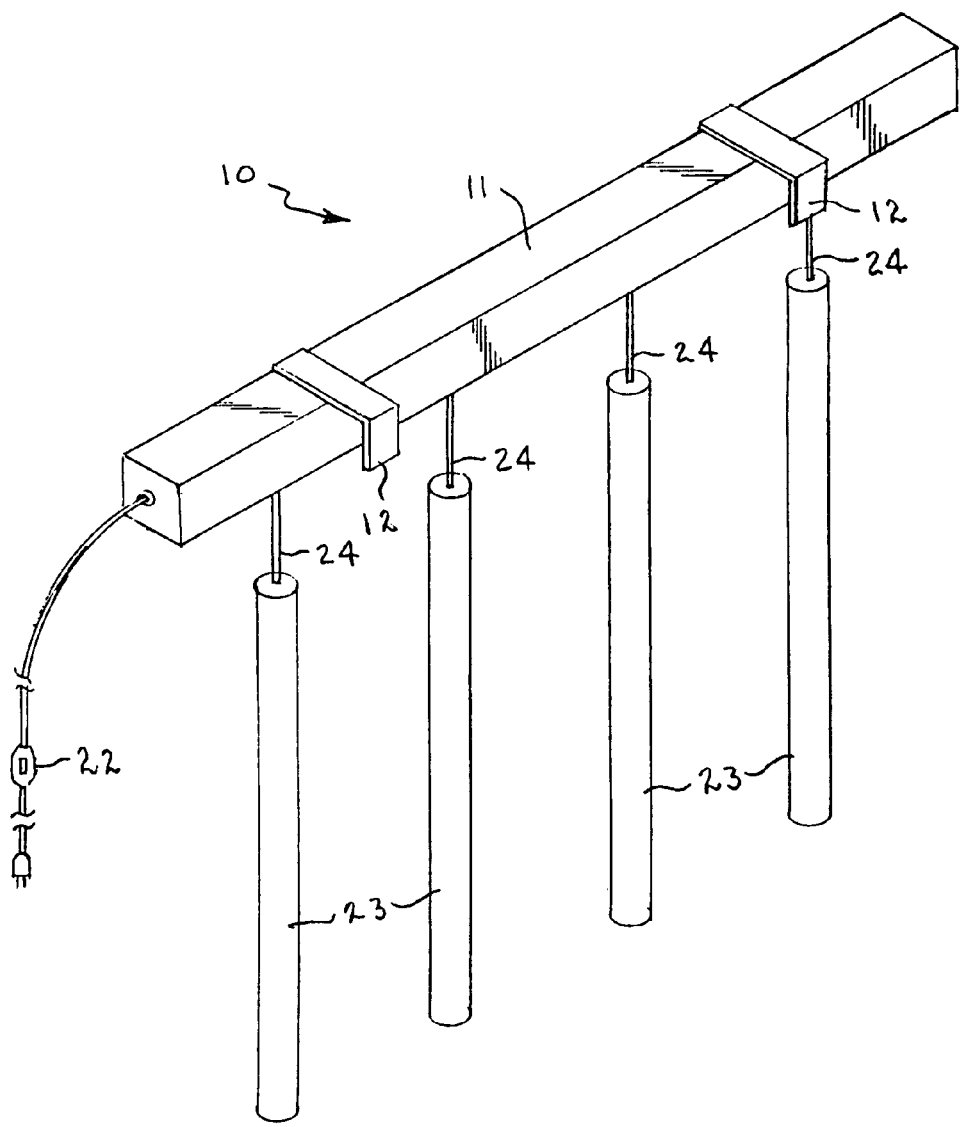
FIG. 2 is an isometric view of the basketball training device as seen from the front and top.
Figure 3:
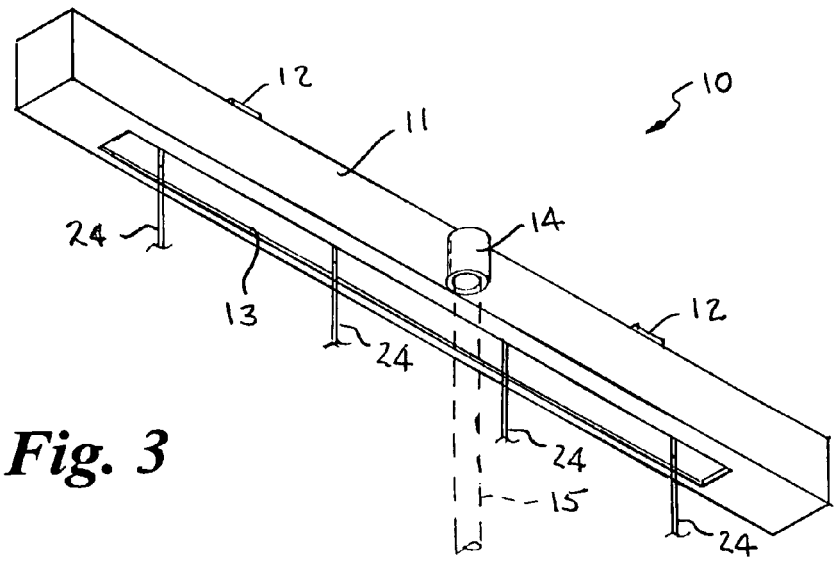
FIG. 3 is an isometric view of the basketball training device housing as seen from the back and bottom, showing the slot in the bottom wall and the tubular receptacle for receiving a broomstick or pole for installing or removing the device onto or from an elevated backboard.
Figure 4:
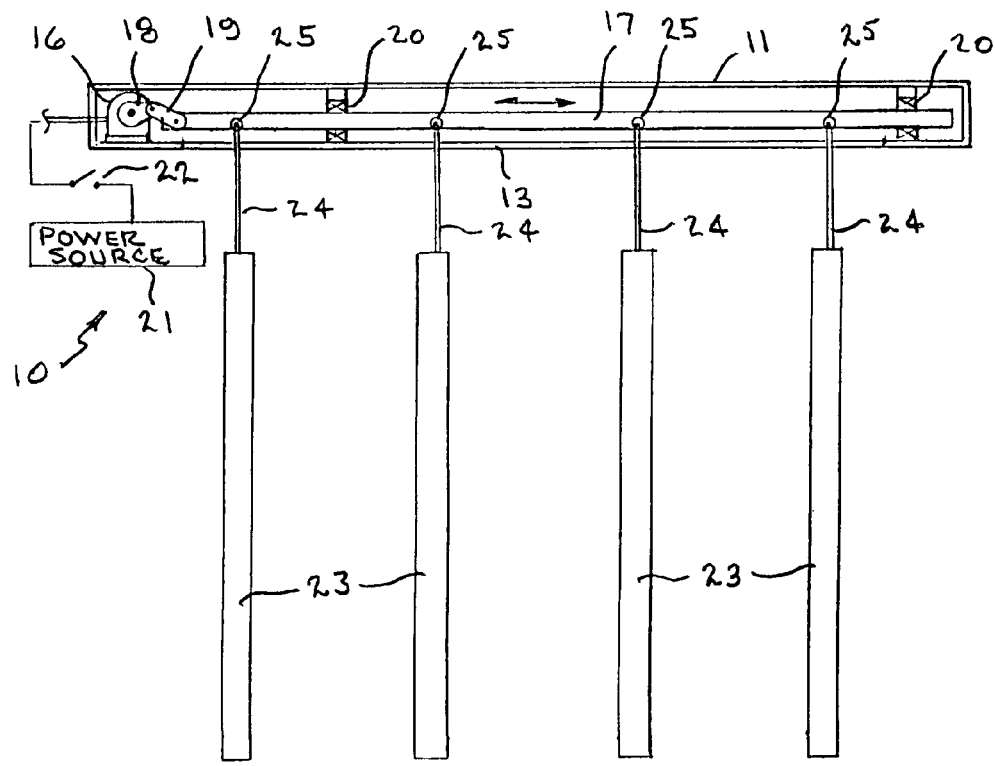
FIG. 4 is a longitudinal cross section through the housing of the basketball training device showing, somewhat schematically, the components contained in the housing.

Referring now additionally to FIGS. 2-4 of the drawings by numerals of reference, there is shown a preferred embodiment of the portable basketball training device 10 for creating visual distractions on the back side of the elevated basketball backboard 5 in the vicinity of the hoop or rim 6 to facilitate increasing a player's concentration, focus, skill and accuracy in goal shooting.

The training device 10 includes a generally elongate rectangular housing 11 sized to reside adjacent to the back side of the transparent basketball backboard 5. The housing 11 is provided with mounting means, such as a pair of inverted L-shaped brackets 12, for mounting the housing at the upper end of the transparent basketball backboard 5 on the back side of the backboard. In the exemplary embodiment, the L-shaped brackets 12 are received over the top edge of the backboard. It should be understood that the housing 12 may be mounted at the upper end of the back side of the backboard by other conventional mounting means, such as clamps, clips, screws, bolts, fabric hook and loop fasteners, etc. As seen in FIG. 3, the bottom wall of the housing 11 is provided with a slot 13, or the bottom of the housing may be open.

In the exemplary embodiment with the L-shaped brackets 12, the housing 12 is provided with a tubular receptacle 14 sized to receive the end of a broom handle 15, or other elongate pole, represented in dashed line, for manually lifting the housing to engage and disengage the L-shaped brackets 12 onto, and off of, the top edge of the elevated backboard.

As shown somewhat schematically in FIG. 4, the housing 11 contains an electric motor 16 having a rotary output shaft operatively connected with an elongate reciprocating bar or rod 17 movably mounted in the housing by a crank arm 18 and link member 19. The crank arm 18 and link member 19 convert the rotary motion to reciprocating motion and causes the bar or rod 17 to move in a reciprocating motion along, or relative to, a generally horizontal plane. The reciprocating bar or rod 17 may be supported on linear thrust bearings 20 intermediate its ends. The motor 16 is connected with a power source 21, such as battery, or a standard 110 v wall outlet through an on-off switch 22. It should be understood that the crank arm/link connection is shown for purposes of example only, and the elongate reciprocating bar or rod 17 may be connected to the motor 16 by other conventional means for converting the rotary motion of the motor to reciprocating motion, such as wheels, link arms, gears, etc.

A plurality of movable vision distracters 23 are suspended from the reciprocating bar or rod 17 to be movably disposed on the back side of the transparent backboard 5 when the housing 11 is mounted thereon, each having an elongate body portion extending downwardly from the housing along the back side of the backboard and terminating in the vicinity of the basketball hoop or rim 6. The vision distracters 23 are moved responsive to the reciprocating movement of the reciprocating bar or rod 17 so as to create a visual distraction when a player views the hoop or rim and backboard.

In the exemplary embodiment, the vision distracters 23 are illustrated, for purposes of example only, as relatively thin elongate cylindrical or tubular members formed of a lightweight material such as closed-cell foam. The vision distracters 23 may be provided in various different colors. A currently popular commercially available device suitable for use as a vision distracter is a foam cheering "noodle" which is widely used at sporting events and typically held high and waved by the spectator fans during a game. Another popular commercially available device suitable for use as a vision distracter is a "pom-pon", "pom-pom", or "pom", or a cheering streamer, which is used by cheerleaders at sporting events and are also held high and waved by the spectator fans during a game.

Each of the vision distracters 23 is suspended from the reciprocating bar or rod 17 in laterally spaced relation by a flexible cord or cable 24 which extends through the open end or slot 13 in the bottom of the housing 11 and is attached at an upper end to the reciprocating bar or rod 17 and at a lower end to the top of the vision distracter. Optionally one or more swivels 25 may be connected between the reciprocating bar and the cord or cable 24 and the vision distracters 23. Alternatively, each vision distracter 23 may be suspended from the reciprocating bar or rod 17 by a rigid rod that extends through the open end or slot 13 in the bottom of the housing and is attached at an upper end to the reciprocating bar and at a lower end to the top of the vision distracter, depending upon the type of vision distracters used. Rigid spacer bars may also be connected horizontally between the laterally spaced vision distracters to prevent them from becoming entangled.

In operation and use, when the on-off switch 22 is turned on, the reciprocating bar or rod 17 moves in a reciprocating motion along, or relative to, a generally horizontal plane and causes the vision distracters 23 to swing or bounce from side behind the backboard 5 in the vicinity of the hoop or rim 6. This motion tends to distract the player's attention and cause them to lose their concentration on making the shot. However, over time, a player will learn to increase their concentration and focus to overcome this distraction, and thereby enhance their skill and accuracy in goal shooting.

While this invention has been described fully and completely with special emphasis upon preferred embodiments, it should be understood that within the scope of the appended claims the invention may be practiced otherwise than as specifically described herein.

The invention claimed is:

1. A portable basketball training device for creating visual distractions in the vicinity of a rim of an elevated transparent basketball backboard to facilitate increasing a player's concentration, focus, skill and accuracy in goal shooting, comprising:
   a portable basketball goal having an elevated transparent backboard having a back side and a rim on a front side; and
   an elongate generally rectangular housing having an opening in a bottom end, said housing sized to reside adjacent to a back side of the transparent basketball backboard at upper end thereof;
   mounting means on said housing for mounting said housing at the upper end of the transparent basketball backboard on the back side thereof;
   an electric motor and an elongate reciprocating bar contained in said housing, said motor and said bar operatively connected by reciprocating means for moving said bar in a reciprocating motion along a generally horizontal plane;
   a plurality of elongate movable vision distracters suspended at one end from said reciprocating bar in laterally spaced relation, each having an elongate body portion extending downwardly from said housing movably disposed on the back side of said transparent basketball backboard in the vicinity of the rim when said housing is mounted thereon; and
   said vision distracters swing from side to side responsive to reciprocating movement of said reciprocating bar to create a visual distraction to a player viewing the rim and backboard.

2. The basketball training device according to claim 1, wherein said vision distracters comprise elongate colored streamers.

3. The basketball training device according to claim 1, wherein
   said vision distracters comprise elongate cylindrical members formed of a colored lightweight foam material.

* * * * *